US011197339B2

(12) United States Patent
Nam et al.

(10) Patent No.: US 11,197,339 B2
(45) Date of Patent: Dec. 7, 2021

(54) BEAMFORMED TRANSMISSION OF A C-DRX WAKEUP SIGNAL

(71) Applicant: QUALCOMM Incorporated, San Diego, CA (US)

(72) Inventors: Wooseok Nam, San Diego, CA (US); Muhammad Nazmul Islam, Littleton, MA (US); Tao Luo, San Diego, CA (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/439,585

(22) Filed: Jun. 12, 2019

(65) Prior Publication Data

US 2019/0387572 A1 Dec. 19, 2019

Related U.S. Application Data

(60) Provisional application No. 62/685,738, filed on Jun. 15, 2018.

(51) Int. Cl.
*H04W 52/02* (2009.01)
*H04W 76/28* (2018.01)
(Continued)

(52) U.S. Cl.
CPC ............ *H04W 76/28* (2018.02); *H04W 8/24* (2013.01); *H04W 24/08* (2013.01); *H04W 52/0229* (2013.01); *H04W 72/046* (2013.01); *H04W 88/02* (2013.01); *H04W 88/08* (2013.01)

(58) Field of Classification Search
CPC ..... H04W 16/28; H04W 24/08; H04W 48/12; H04W 52/0216; H04W 52/0229;
(Continued)

(56) References Cited

U.S. PATENT DOCUMENTS 9,853,702 B1 * 12/2017 Liang .................... H04L 5/0007
2016/0157120 A1 * 6/2016 Shi ........................ H04W 24/08
370/252

(Continued)

OTHER PUBLICATIONS

Huawei et al: "On Configurations and Procedures of Power Saving Signal," 3GPP Draft; R1-1805964, 3rd Generation Partnership Project (3GPP), Mobile Competence Centre; 650, Route des Lucioles; F-06921 Sophia-Antipolis Cedex; France, vol. RAN WG1, no. Busan, Korea; May 21, 2018-May 25, 2018, May 20, 2018, XP051441183, 7 Pages, Retrieved from the Internet: URL: http://www.3gpp.org/ftp/Meetings%5F3GPP%5FSYNC/RAN1/Docs/ [retrieved on May 20, 2018] the whole document.
(Continued)

*Primary Examiner* — Minh Trang T Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may receive (or a base station may transmit) information identifying a selected configuration for a discontinuous reception (DRX) wakeup signal (WUS) for the user equipment, wherein the selected configuration is one of a plurality of configurations; and selectively monitor a wakeup signal resource according to the selected configuration. Numerous other aspects are provided.

30 Claims, 10 Drawing Sheets

(51) Int. Cl.
*H04W 72/04* (2009.01)
*H04W 88/08* (2009.01)
*H04W 24/08* (2009.01)
*H04W 88/02* (2009.01)
*H04W 8/24* (2009.01)

(58) Field of Classification Search
CPC ........... H04W 52/0235; H04W 72/046; H04W 76/28; H04W 88/02; H04W 88/08; H04W 8/24
See application file for complete search history.

(56) References Cited

U.S. PATENT DOCUMENTS

| | | | | |
|---|---|---|---|---|
| 2016/0337975 | A1* | 11/2016 | Li | H04W 16/14 |
| 2018/0049126 | A1* | 2/2018 | Cheng | H04W 52/0229 |
| 2019/0045481 | A1* | 2/2019 | Sang | H04B 1/713 |
| 2019/0327679 | A1* | 10/2019 | Gupta | H04W 52/0229 |
| 2020/0022082 | A1* | 1/2020 | Ljung | H04W 72/042 |
| 2020/0196242 | A1* | 6/2020 | Hoglund | H04W 52/0229 |

OTHER PUBLICATIONS

Huawei et al: "Updated Feature Lead Summary of Wake-up Signal Configurations and Procedures in NB-IoT", 3GPP Draft; R1-1807560, 3rd Generation Partnership Project (3GPP) Draft; R1-1807560, 3rd Generation Partnership Project (3GPP), Mobile Competence Centre; 650, Route des Lucioles; F-06921 Sophia-Antipolis Cedex; France, vol. RAN WG1, no. Busan, Korea; May 21, 2018-May 25, 2018, May 24, 2018, XP051463235, 19 pages.

International Search Report and Written Opinion—PCT/US2019/037050—ISA/EPO—dated Jul. 29, 2019 (183773WO).

Mediatek Inc: "Wake Up Signal Configuration for NB-IoT", 3GPP Draft; R1-1805996-Mediatek-WUS Configuration for NB-IoT, 3rd Generation Partnership Project (3GPP), Mobile Competence Centre; 650, Route des Lucioles; F-06921 Sophia-Antipolis Cedex; France, vol. RAN WG1, no. Busan, South Korea; May 21, 2018-May 25, 2018, May 20, 2018, XP051441214, 6 pages, Retrieved from the Internet: URL: http://www.3gpp.org/ftp/Meetings%5F3GPP%5FSYNC/RAN1/Docs/ [retrieved on May 20, 2018] the whole document.

QUALCOMM: "Wakeup Signaling for Multi-beam System," 3GPP Draft; R2-1713803 Wakeup Signaling for Multi-Beam Systems, 3rd Generation Partnership Project (3GPP), Mobile Competence Centre; 650, Route des Lucioles; F-06921 Sophia-Antipolis Cedex; France, vol. RAN WG2, no. Reno, USA; Nov. 27, 2017-Dec. 1, 2017, Nov. 17, 2017, XP051372548, Retrieved from the Internet: URL: http://www.3gpp.org/ftp/tsg%5Fran/WG2%5FRL2/TSGR2%5F100/Docs/ [retrieved on Nov. 17, 2017] the whole document.

* cited by examiner

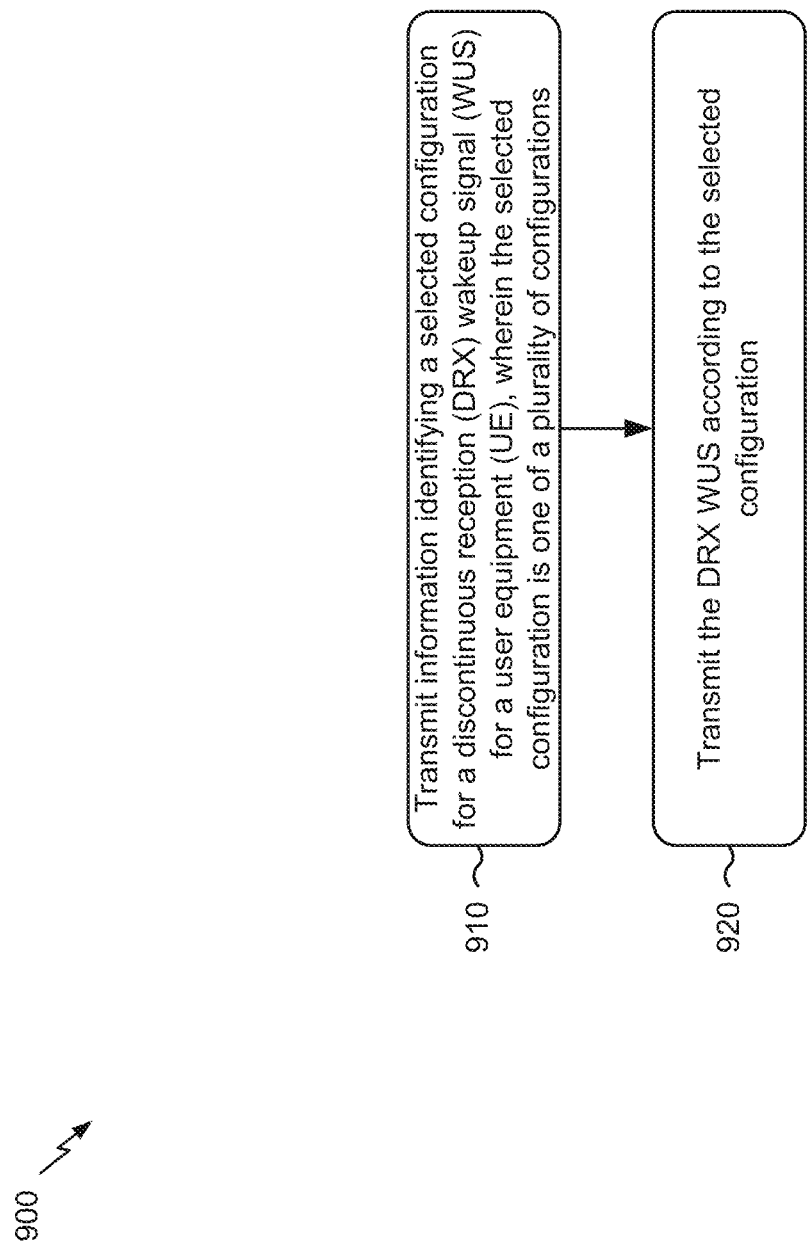

BEAMFORMED TRANSMISSION OF A C-DRX WAKEUP SIGNAL

CROSS-REFERENCE TO RELATED APPLICATIONS UNDER 35 U.S.C. § 119

This application claims priority to U.S. Provisional Patent Application No. 62/685,738, filed on Jun. 15, 2018, entitled "TECHNIQUES AND APPARATUSES FOR BEAMFORMED TRANSMISSION OF A C-DRX WAKEUP SIGNAL IN 5G/NEW RADIO," which is hereby expressly incorporated by reference herein.

FIELD OF THE DISCLOSURE

Aspects of the present disclosure generally relate to wireless communication, and more particularly to techniques and apparatuses for beamformed transmission of a connected-mode discontinuous reception (C-DRX) wakeup signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies continue to be useful. Preferably, these improvements should be applicable to other multiple access technologies and the telecommunication standards that employ these technologies.

SUMMARY

In some aspects, a method of wireless communication, performed by a user equipment (UE), may include receiving information identifying a selected configuration for a discontinuous reception (DRX) wakeup signal (WUS) for the UE, wherein the selected configuration is one of a plurality of configurations; and selectively monitoring a wakeup signal resource according to the selected configuration.

In some aspects, a UE for wireless communication may include memory and one or more processors operatively coupled to the memory. The memory and the one or more processors may be configured to receive information identifying a selected configuration for a DRX WUS for the UE, wherein the selected configuration is one of a plurality of configurations; and selectively monitor a wakeup signal resource according to the selected configuration.

In some aspects, a non-transitory computer-readable medium may store one or more instructions for wireless communication. The one or more instructions, when executed by one or more processors of a UE, may cause the one or more processors to receive information identifying a selected configuration for a DRX WUS for the UE, wherein the selected configuration is one of a plurality of configurations; and selectively monitor a wakeup signal resource according to the selected configuration.

In some aspects, an apparatus for wireless communication may include means for receiving information identifying a selected configuration for a DRX WUS for the apparatus, wherein the selected configuration is one of a plurality of configurations; and means for selectively monitoring a wakeup signal resource according to the selected configuration.

In some aspects, a method of wireless communication, performed by a base station, may include transmitting information identifying a selected configuration for a DRX WUS for a UE, wherein the selected configuration is one of a plurality of configurations; and transmitting the DRX WUS according to the selected configuration.

In some aspects, a base station for wireless communication may include memory and one or more processors operatively coupled to the memory. The memory and the one or more processors may be configured to transmit information identifying a selected configuration for a DRX WUS for a UE, wherein the selected configuration is one of a plurality of configurations; and transmit the DRX WUS according to the selected configuration.

In some aspects, a non-transitory computer-readable medium may store one or more instructions for wireless communication. The one or more instructions, when executed by one or more processors of a base station, may cause the one or more processors to transmit information identifying a selected configuration for a DRX WUS for a UE, wherein the selected configuration is one of a plurality of configurations; and transmit the DRX WUS according to the selected configuration.

In some aspects, an apparatus for wireless communication may include means for transmitting information identifying a selected configuration for a DRX WUS for a UE, wherein the selected configuration is one of a plurality of configurations; and means for transmitting the DRX WUS according to the selected configuration.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
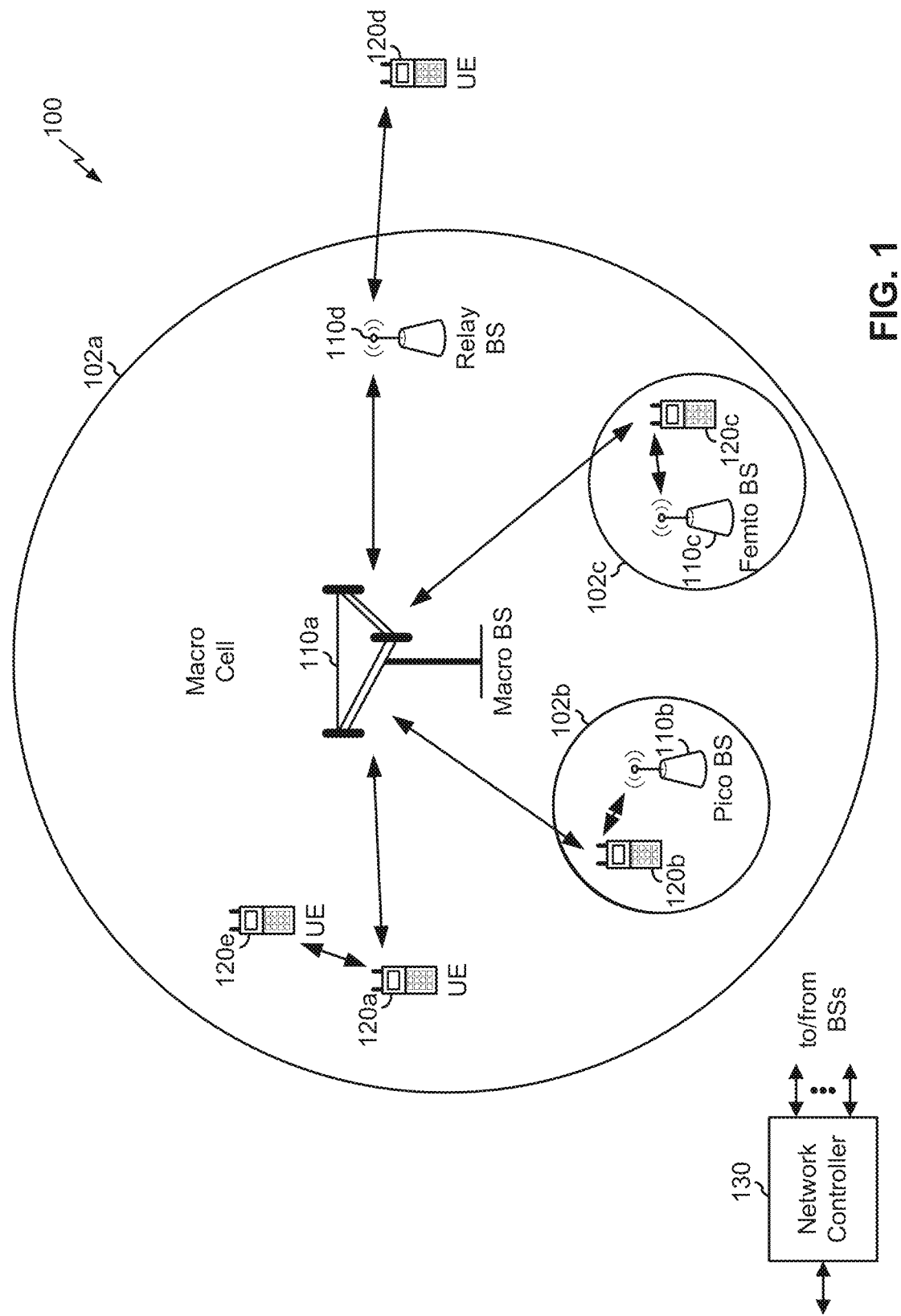
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
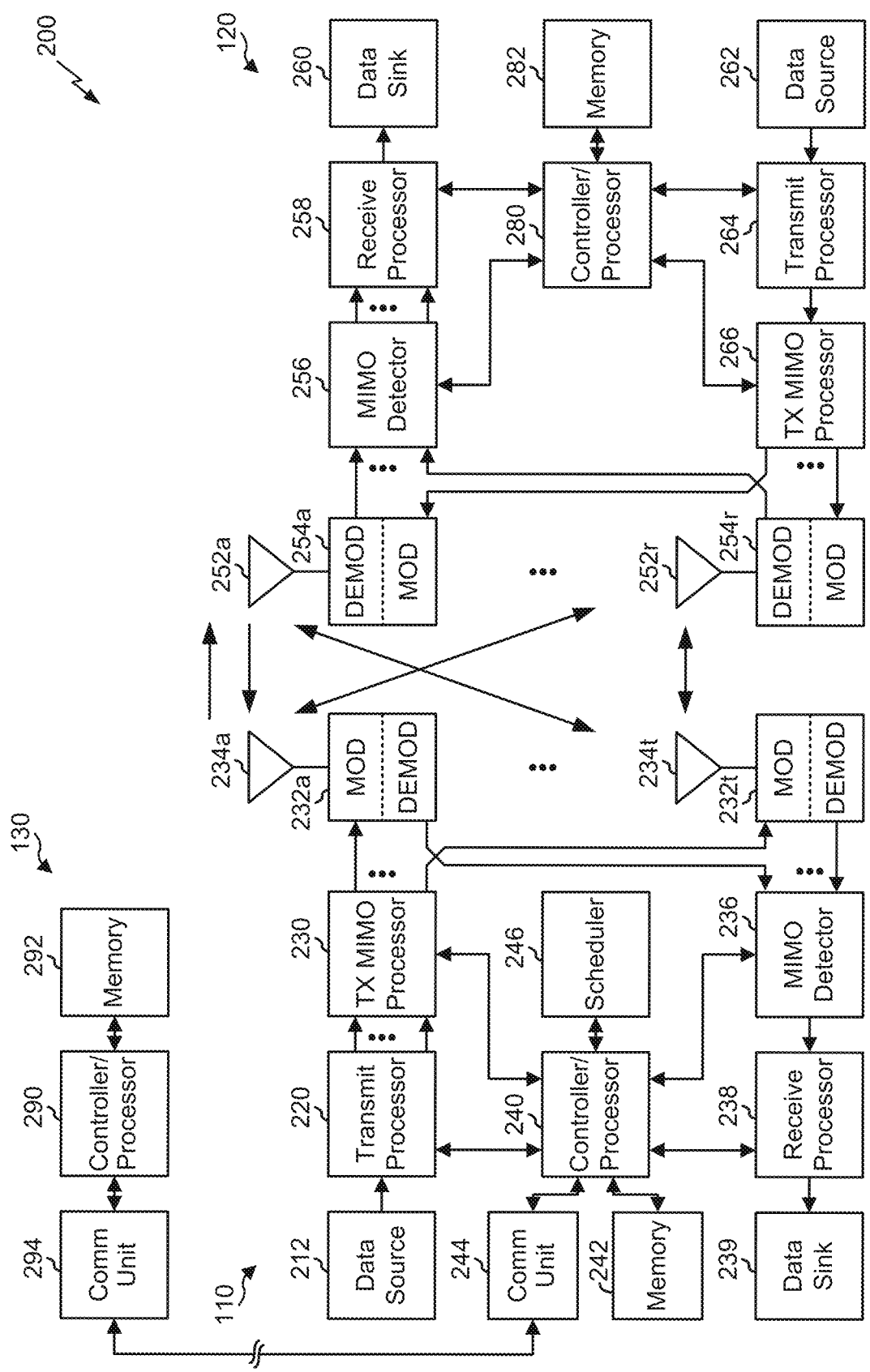
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with beamformed transmission of a connected-mode discontinuous reception (C-DRX) wakeup signal in 5G/New Radio (5G/NR), as described in more detail elsewhere herein. For example, controller/processor 240 of BS 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving information identifying a selected configuration for a discontinuous reception (DRX) wakeup signal (WUS) for the UE, wherein the selected configuration is one of a plurality of configurations; means for selectively monitoring a wakeup signal resource according to the selected configuration; means for transmitting information indicating a capability of the UE with regard to the DRX WUS or a requested configuration for the DRX WUS; means for transmitting a radio link quality parameter to permit the selected configuration to be selected from the plurality of configurations; means for determining that a radio link quality parameter satisfies a threshold; means for transmitting the radio link quality parameter, to permit the selected configuration to be selected from the plurality of configurations, based at least in part on the radio link quality parameter satisfying the threshold; and/or the like. In some aspects, such means may include one or more components of UE 120 described in connection with FIG. 2.

In some aspects, BS 110 may include means for transmitting information identifying a selected configuration for a discontinuous reception (DRX) wakeup signal (WUS) for a user equipment (UE), wherein the selected configuration is one of a plurality of configurations; means for transmitting the DRX WUS according to the selected configuration; means for receiving information indicating a capability of the UE with regard to the DRX WUS or a requested configuration for the DRX WUS, wherein the selected configuration is selected based at least in part on the information indicating the capability or the requested configuration; means for transmitting information identifying selected configurations for DRX WUSs for a plurality of UEs, wherein a selected configuration for a first UE of the plurality of UEs is different than a selected configuration for a second UE of the plurality of UEs; means for transmitting the DRX WUSs according to the selected configurations; and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
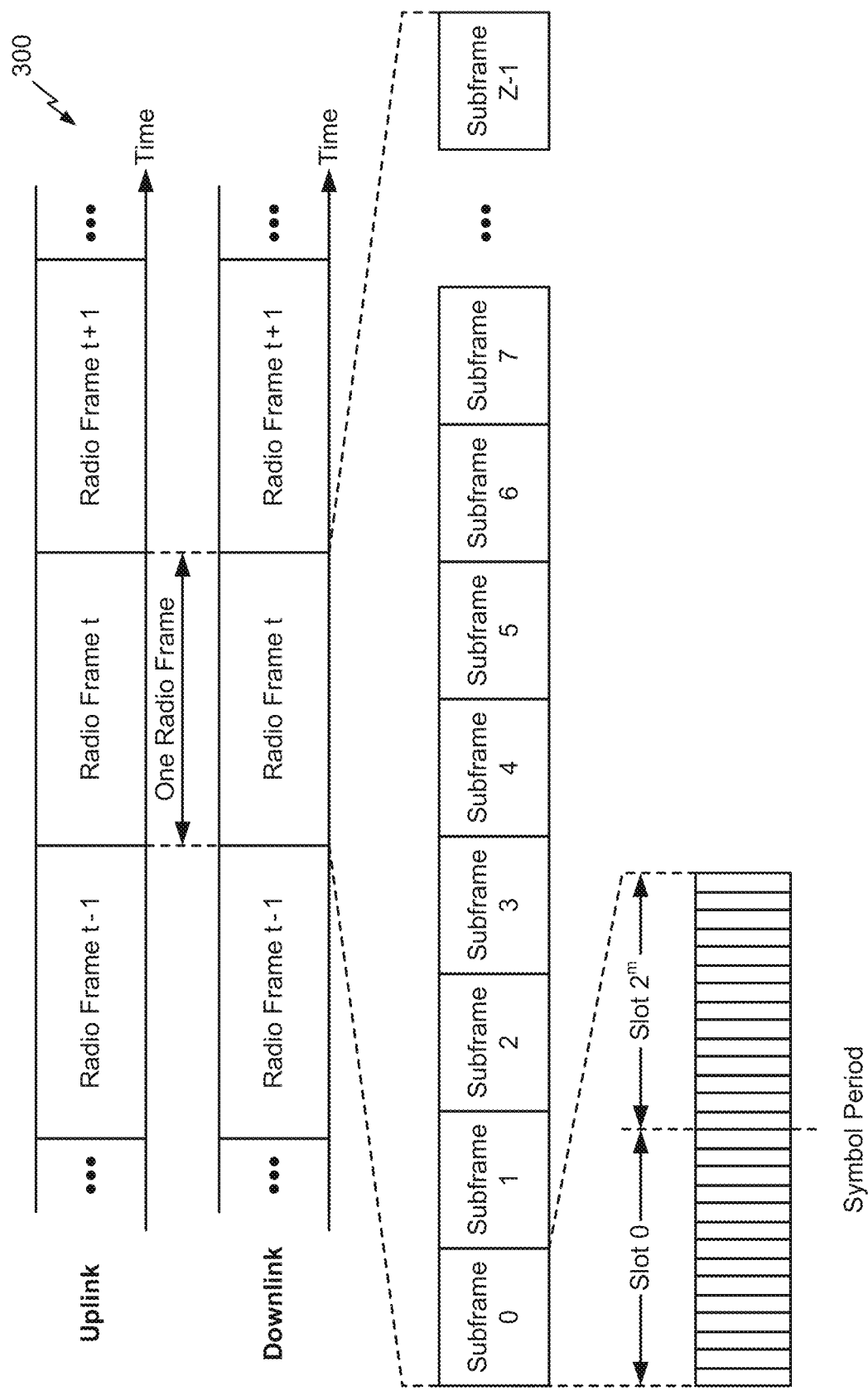
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
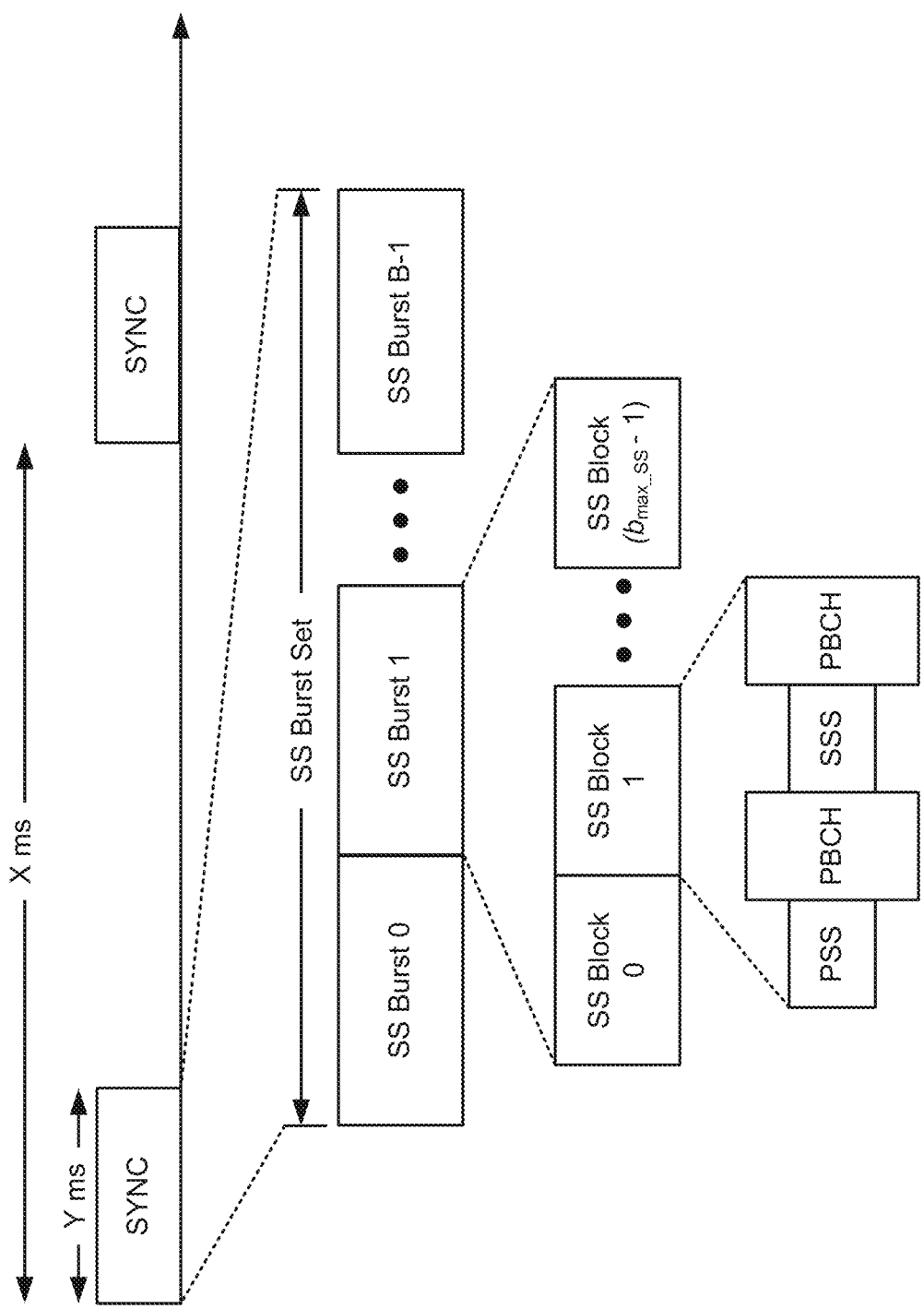
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
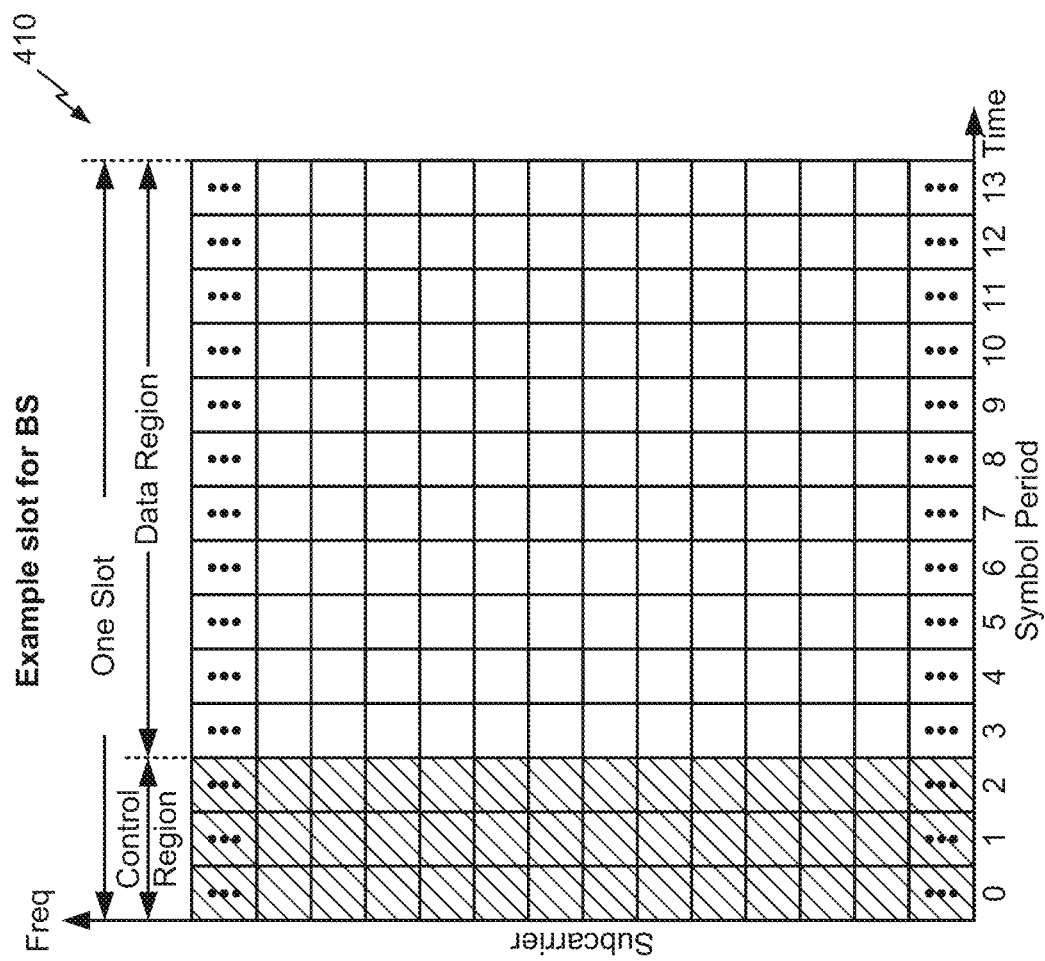
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

If there is no data traffic destined to or originated from a UE for a certain period of time, the UE may operate in a discontinuous reception (DRX) mode (e.g., a connected-mode DRX (C-DRX) mode) wherein the UE transitions between an active state (e.g., an awake period or C-DRX ON duration where the UE wakes up to determine if data is available for the UE) and a sleep state (e.g., where the UE shuts down various hardware or processes to conserve power). The UE may determine if data is available by monitoring a control channel during an awake period, such as a physical downlink control channel (PDCCH). The PDCCH may carry or otherwise convey an indication that the base station has data ready to transmit to the UE. If the UE receives any PDCCH or data transmission (e.g., a physical downlink shared channel (PDSCH)) from the base station during an active state, the UE may terminate the DRX mode. Otherwise, the UE may return to the sleep state at the end of the active state.

In some aspects, the UE may receive a wakeup signal before transitioning to an active state. The wakeup signal may be UE-specific, or may be associated with a group of UEs. The wakeup signal may indicate that the UE should wake up to monitor the control channel and/or receive data transmission from the base station during the next active state. When the UE does not receive the wakeup signal, the UE may determine that no control channel and corresponding data transmission will be received during the next active state, and may therefore skip the active state, thereby saving battery power. In some aspects, a particular module or sub-system of the UE may receive the wakeup signal. This module or sub-system may be referred to herein as a wakeup receiver. This conserves battery and radio resources that would otherwise be used to activate communication chains and/or processors of the UE to receive the wakeup signal. When the wakeup receiver detects a WUS, the modem and/or entire communication chain (e.g., any combination of antenna 252, MOD 254, MIMO detector 256, receive processor 258, controller/processor 280, and/or the like) may enter an active state in a next ON duration to receive a control channel and subsequent shared channel. In some aspects, the wakeup signal may be a particular waveform, a particular sequence, or a specialized control channel (e.g., PDCCH).

During a C-DRX OFF duration, the UE may not be expected to monitor any downlink signal (e.g., a channel state information reference signal, a synchronization signal block (SSB), etc.), since monitoring of such signals generally entails wakeup of the UE and thus may consume significant power. Thus, operations such as beam tracking, beam management, and/or the like may be impaired during the OFF duration. This may mean that beam-pair links of the BS and the UE, as well as time and frequency synchronization of the BS and the UE, can significantly deviate or drift during the OFF duration, particularly for high-mobility UEs and/or UEs with long OFF durations. Furthermore, in some cases, multiple UEs that are on the same C-DRX cycle may share a WUS (e.g., a WUS associated with a group of UEs), which may mean that a single directional beam cannot be used for all such UEs.

Some techniques and apparatuses described herein provide configuration of UEs with a selected configuration for a DRX WUS. The selected configuration may be selected from a plurality of configurations for DRX WUSs, which may include a pseudo-omnidirectional beam, a beam swept approach with multiple directional beams, a fallback mode wherein the UE always wakes up during the ON duration (i.e., irrespective of whether the WUS is received) or another configuration. The BS may determine the selected configuration based at least in part on a requested configuration from the UE, radio link quality parameters, location of the UE, or other concerns. In this way, different configurations can be used for DRX WUSs for different UEs, which improves versatility of the DRX WUSs and which improves coverage of the DRX WUS for UEs in different scenarios (e.g., cell-edge versus center-of-cell, a single UE versus a group of UEs, etc.).

Figure 5:
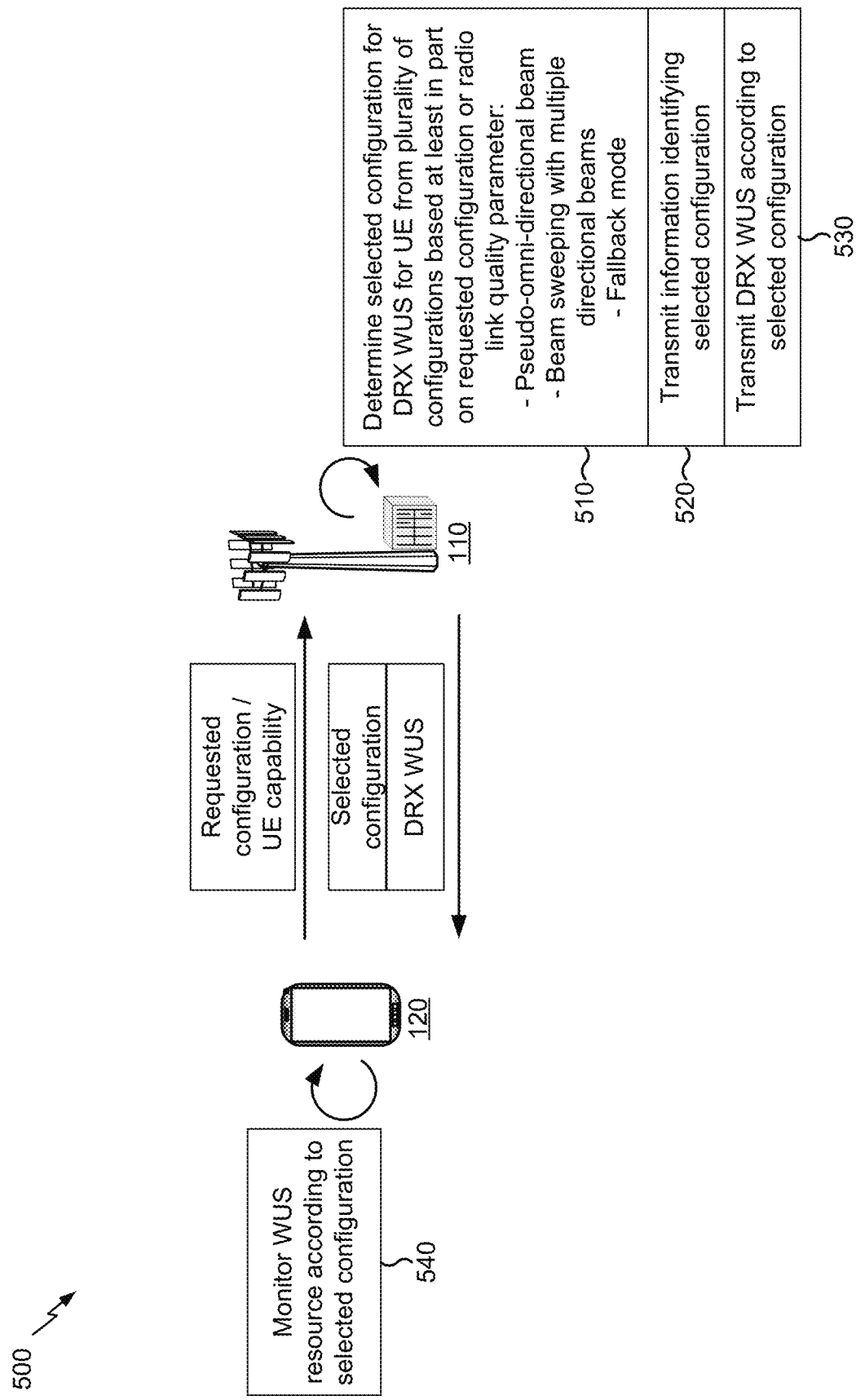
FIG. 5 is a diagram illustrating an example of beamformed transmission of a connected-mode discontinuous reception (C-DRX) wakeup signal (WUS) in 5G/NR, in accordance with various aspects of the present disclosure.

FIG. 5 is a diagram illustrating an example 500 of beamformed transmission of a C-DRX wakeup signal in 5G/NR, in accordance with various aspects of the present disclosure.

As shown in FIG. 5, and by reference number 510, a BS 110 may determine a selected configuration for a DRX WUS for a UE 120. For example, the BS 110 may select the selected configuration from a plurality of configurations for the DRX WUS. As shown, the plurality of configurations may include a pseudo-omnidirectional beam, a beam swept approach with multiple directional beams, and/or a fallback mode wherein the UE 120 always wakes up during the ON duration. These are simply examples of configurations and other configurations are contemplated herein. In some aspects, the BS 110 may determine the selected configuration based at least in part on radio link quality, a UE capability, a UE request, and/or the like. In some aspects, the BS 110 may determine selected configurations for a plurality of UEs 120, such as each UE 120 covered by the BS 110, a group of UEs 120 associated with a same C-DRX cycle, a set of UEs 120 for which the BS 110 is configuring a C-DRX cycle, and/or the like.

In some aspects, the selected configuration may be associated with a pseudo-omnidirectional beam for the DRX WUS. As used herein, a pseudo-omnidirectional beam may refer to a beam that has a wide angular coverage, e.g., approximately 360 degrees for an omnidirectional cell or approximately 120 degrees for a 3-sectored cell. Additionally, or alternatively, a pseudo-omnidirectional beam may refer to a beam that is used for broadcasted information (e.g., to all UEs within a cell, to a wider angle than a directional beam used for UE-specific information, etc.). Additionally, or alternatively, a pseudo-omnidirectional beam may refer to a beam that does not undergo beamforming during transmission (e.g., single antenna transmission). The pseudo-omnidirectional beam may be more robust to beam deviation during a sleep state of a UE 120 than a directional beam. Furthermore, multiple UEs 120 may be able to share the pseudo-omnidirectional beam (e.g., due to the non-directionality of the beam). Still further, the pseudo-omnidirectional beam may use fewer resources than the beam swept directional beams described below, and may provide a shorter WUS occasion.

In some aspects, the selected configuration may be associated with beam sweeping. For example, the DRX WUS may be transmitted with multiple directional beams. In this case, a set of directional beams may be swept for the DRX WUS transmission during a WUS occasion associated with the C-DRX ON duration. Although a directional beam may have a narrower angular coverage than the pseudo-omnidirectional beam, a directional beam may be associated with a higher beamforming gain, which may improve performance of the DRX WUS for UEs 120 with poor radio link quality, such as UEs 120 at the cell edge.

In some aspects, the selected configuration may indicate that the UE 120 is to perform the C-DRX cycle in a fallback mode. In some aspects, the fallback mode may correspond to the legacy DRX operation without any DRX WUS transmission. In the fallback mode, the UE 120 may awaken (e.g., may awaken the modem and/or a communication chain (e.g., any combination of antenna 252, MOD 254, MIMO detector 256, receive processor 258, controller/processor 280, and/or the like) for communicating a physical downlink control channel, a physical downlink shared channel, a physical uplink control channel, and/or a physical uplink shared channel) at each C-DRX ON duration. The fallback mode may use more battery power than the other configurations described above. Thus, the fallback mode may be useful for UEs 120 with particularly poor coverage or radio link quality such that reliable WUS detection is not expected and, as such, the WUS may be less useful.

In some aspects, the BS 110 may determine the selected configuration based at least in part on a requested configuration or a UE capability. For example, the UE 120 may transmit information identifying a requested configuration. Additionally, or alternatively, the UE 120 may transmit information identifying a list of requested configurations (e.g., a ranked list, an unranked list, and/or the like). Additionally, or alternatively, the UE 120 may transmit information identifying a capability of the UE 120 with regard to the plurality of configurations. For example, the capability may indicate which configurations the UE 120 supports. The above information may be provided using signaling, such as radio resource control signaling, a media access control control element (MAC CE), and/or the like.

In some aspects, the BS 110 may determine the selected configuration based at least in part on a radio link quality parameter. For example, the UE 120 may report radio link quality to the BS 110. In some aspects, the UE 120 may report the radio link quality during an ON duration and/or periodically. In some aspects, the UE 120 may provide a report, such as a reference signal received power (RSRP) report via a physical uplink control channel, and/or the like. In some aspects, the UE 120 may report the radio link quality based at least in part on a threshold. For example, the UE 120 may report the radio link quality when the radio link quality satisfies a threshold. As another example, the UE 120 may report the radio link quality when there is a state change (e.g., when the threshold goes from being satisfied to unsatisfied or vice versa). The threshold and/or a hysteresis value associated with the threshold may be predetermined or may be semi-statically configured by the BS 110. When the radio link quality satisfies a particular threshold (e.g., when the radio link quality is "good"), the BS 110 may select a pseudo-omnidirectional beam configuration. When the radio link quality does not satisfy the particular threshold (e.g., when the radio link quality is "bad"), the BS 110 may select a beam sweeping configuration or a fallback configuration.

As shown by reference number 520, the BS 110 may transmit information identifying the selected configuration. For example, the BS 110 may transmit a radio resource control message, downlink control information, a MAC CE, or another type of signaling to configure the UE 120 to use the selected configuration for the DRX WUS. In some aspects, the BS 110 may configure the UE 120 to use the selected configuration. In some aspects, the BS 110 may configure multiple, different UEs 120 to use the selected configuration (e.g., a group of UEs 120 that share a C-DRX cycle, all UEs 120 covered by the BS 110, etc.).

As shown by reference number 530, the BS 110 may transmit the DRX WUS according to the selected configuration. For example, the BS 110 may transmit the DRX WUS using a pseudo-omnidirectional beam, a beam swept set of directional beams, or a combination of the above, based at least in part on the selected configuration. In some aspects, the BS 110 may transmit the DRX WUS in a particular resource, such as a WUS resource known to the UE 120.

As shown by reference number 540, the UE 120 may monitor a WUS resource according to the selected configuration. For example, the UE 120 may monitor a WUS resource associated with the pseudo-omnidirectional beam when the UE 120 is configured to use the pseudo-omnidirectional beam (e.g., when the selected configuration for the UE 120 is for the pseudo-omnidirectional beam). As another example, the UE 120 may monitor a WUS resource associated with the beam swept directional beams when the UE 120 is configured to use the beam swept directional beams (e.g., when the selected configuration for the UE 120 is for the beam swept directional beams).

In some aspects, the UE 120 may receive a WUS according to the selected configuration. For example, the UE 120 may receive the WUS transmitted by the BS 110. Based at least in part on receiving the WUS, the UE 120 may wake up in a next ON duration to monitor for a control channel and/or a grant for a shared channel. The UE 120 may receive information on the shared channel, and may reenter a sleep mode when the ON duration has ended. In this way, the UE 120 may selectively monitor WUS resources based at least in part on a configuration for a DRX WUS, and may awaken only when the DRX WUS is received. Thus, battery resources of the UE 120 are conserved, and coverage of the DRX WUS is improved. This may be particularly beneficial in mmW deployments wherein C-DRX UEs may experience significant timing, synchronization, and/or beam pairing drift during a C-DRX OFF duration.

As indicated above, FIG. 5 is provided as an example. Other examples may differ from what is described with respect to FIG. 5.

Figure 6:
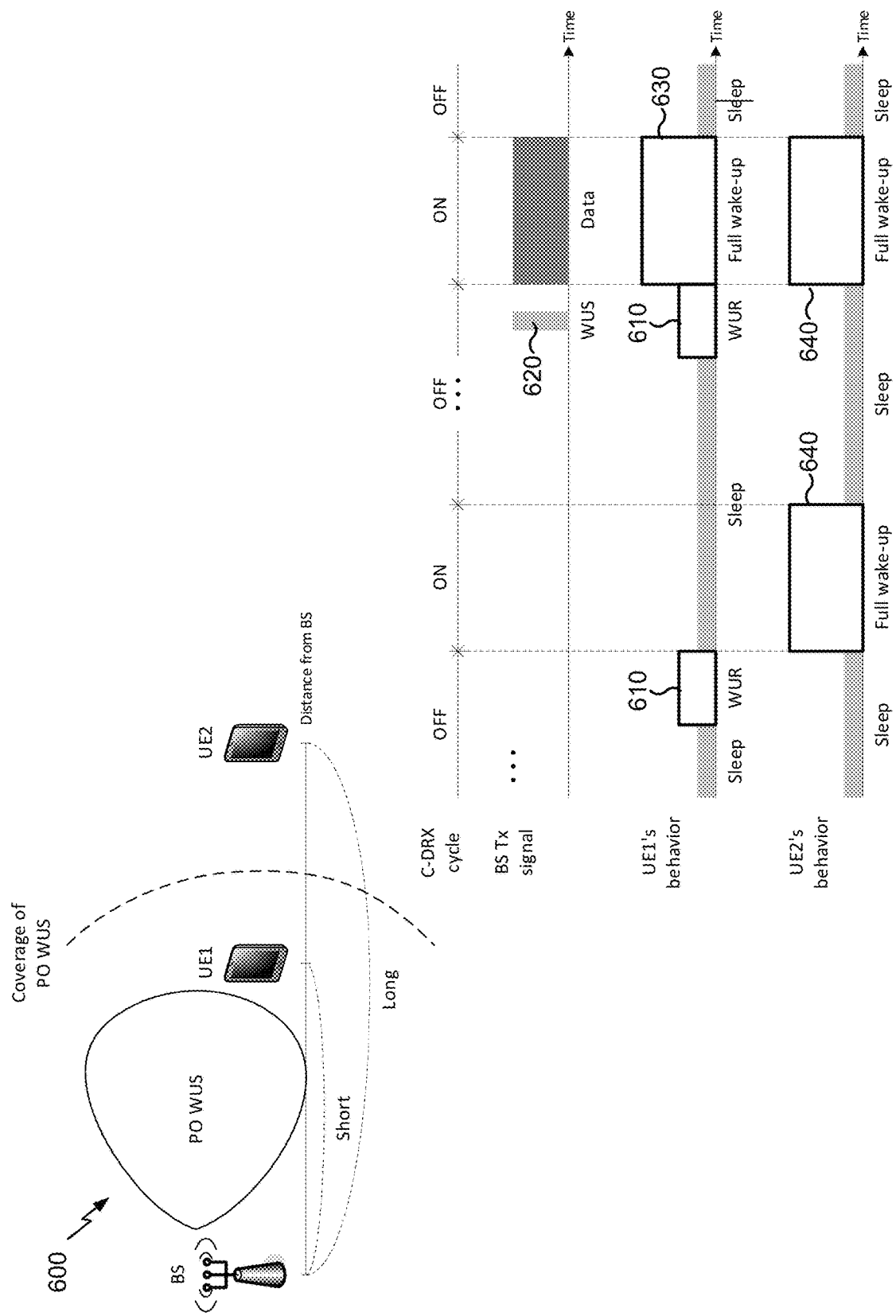
FIG. 6 is a diagram illustrating an example of beamformed transmission of a C-DRX WUS for multiple UEs in 5G/NR, in accordance with various aspects of the present disclosure.

FIG. 6 is a diagram illustrating an example 600 of beamformed transmission of a C-DRX wakeup signal for multiple UEs in 5G/NR, in accordance with various aspects of the present disclosure. As shown, example 600 includes a BS (e.g., BS 110), and two UEs, UE1 and UE2 (e.g., UEs 120). As further shown, UE1 is located closer to the BS than UE2. This may mean that UE1 may experience higher link quality than UE2, and may mean that UE1 is within a range of the pseudo-omnidirectional beam wakeup signal (shown as PO WUS). Conversely, UE2 may experience poor link quality and may be outside the range of the PO WUS. For example, UE2 may be near a cell boundary of the BS.

Assume that the BS configures UE1 to use the pseudo-omnidirectional beam configuration, and that the BS configures UE2 to use the fallback mode (not shown). As shown by reference number 610, a wakeup receiver of UE1 (shown as WUR) may monitor WUS resources. When the wakeup receiver of UE1 detects a pseudo-omnidirectional beam wakeup signal from the BS in the WUR (shown by reference number 620), the UE1 may fully awaken to monitor control channels in a next ON duration (shown by reference number 630). UE2 may awaken in each ON duration, as shown by reference number 640, since UE2 is configured to use the fallback mode.

As indicated above, FIG. 6 is provided as an example. Other examples may differ from what is described with respect to FIG. 6.

Figure 7:
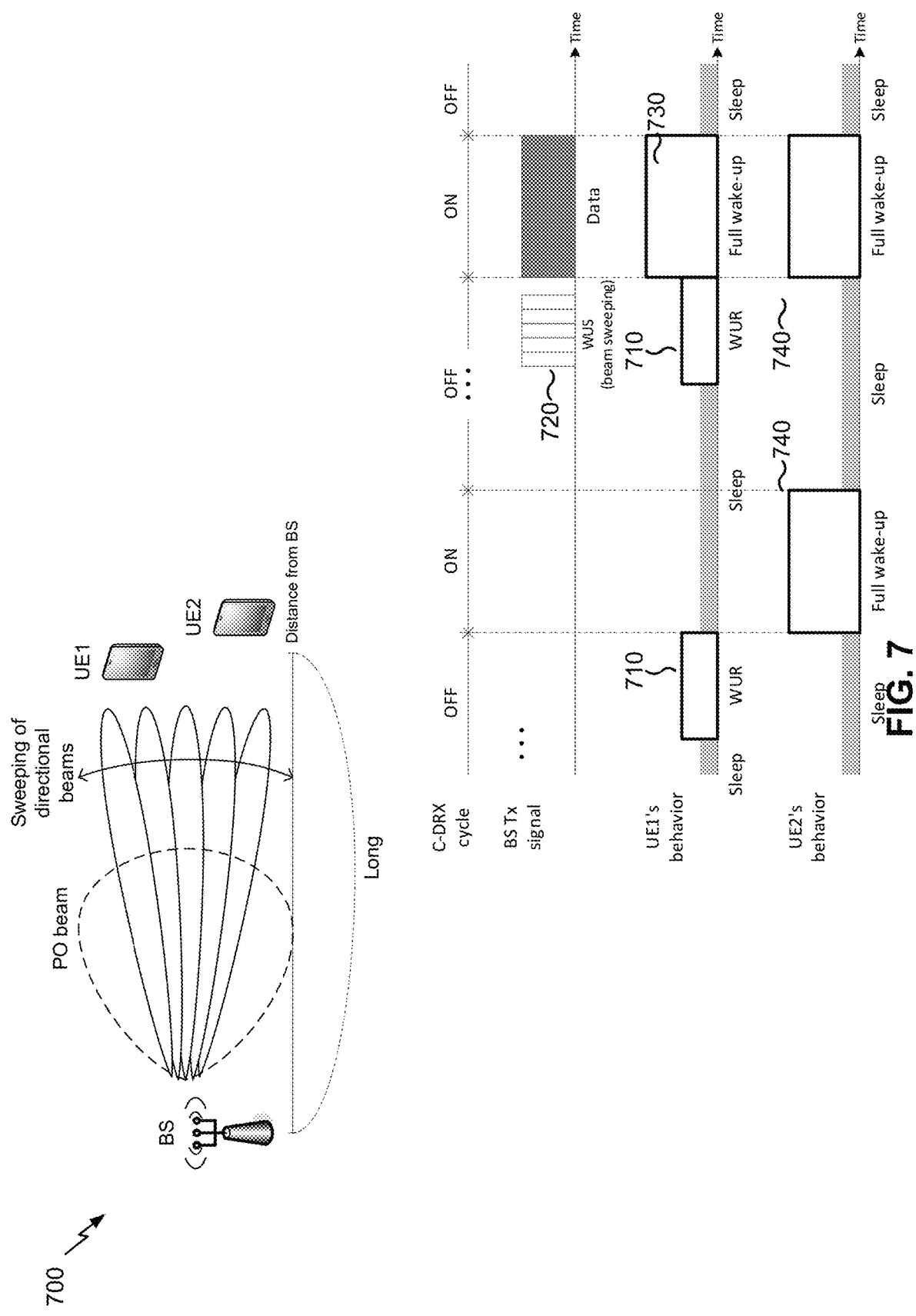
FIG. 7 is a diagram illustrating another example of beamformed transmission of a C-DRX WUS for multiple UEs in 5G/NR, in accordance with various aspects of the present disclosure.

FIG. 7 is a diagram illustrating another example 700 of beamformed transmission of a C-DRX wakeup signal for multiple UEs in 5G/NR, in accordance with various aspects of the present disclosure. As shown, example 600 includes a BS (e.g., BS 110), and two UEs, UE1 and UE2 (e.g., UEs 120). As further shown, UE1 is located slightly closer to the BS than UE2, while UE1 and UE2 are both located outside of the coverage of the pseudo-omnidirectional beam. This may mean that UE1 may benefit from the beam swept directional beam configuration (shown here as sweeping of directional beams).

Assume that the BS configures UE1 to use the beam swept directional beam configuration, and that the BS configures UE2 to use the fallback mode (not shown). As shown by reference number 710, a wakeup receiver of UE1 (shown as WUR) may monitor WUS resources. When the wakeup receiver of UE1 detects a directional beam wakeup signal from the BS in the WUR (shown by reference number 720 with multiple bars to represent the swept beams), the UE1 may fully awaken to monitor control channels in a next ON duration (shown by reference number 730). UE2 may awaken in each ON duration, as shown by reference number 740, since UE2 is configured to use the fallback mode.

As indicated above, FIG. 7 is provided as an example. Other examples may differ from what is described with respect to FIG. 7.

Figure 8:
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs configuration of a C-DRX wakeup signal in 5G/NR.

As shown in FIG. 8, in some aspects, process 800 may include receiving information identifying a selected configuration for a discontinuous reception (DRX) wakeup signal (WUS) for the UE, wherein the selected configuration is one of a plurality of configurations (block 810). For example, the UE (e.g., using antenna 252, DEMOD 254, MIMO detector 256, receive processor 258, controller/processor 280, and/or the like) may receive information identifying a selected configuration for a DRX WUS for the UE, as described above, for example, in connection with FIGS. 5, 6, and 7. The selected configuration may be one of a plurality of configurations. In some aspects, the selected configuration may be determined by a BS that is to transmit the DRX WUS.

As shown in FIG. 8, in some aspects, process 800 may include selectively monitoring a wakeup signal resource according to the selected configuration (block 820). For example, the UE (e.g., using antenna 252, DEMOD 254, MIMO detector 256, receive processor 258, controller/processor 280, a wakeup receiver, and/or the like) may selectively monitor a wakeup signal resource according to the selected configuration, as described above, for example, in connection with FIGS. 5, 6, and 7. In some aspects, the UE may monitor particular resources that are associated with the selected configuration. In some aspects, the UE may not monitor a wakeup signal resource based at least in part on the selected configuration, such as when the UE is configured to use a fallback mode.

Process 800 may include additional aspects, such as any single aspect or any combination of aspects described below and/or in connection with one or more other processes described elsewhere herein.

In a first aspect, the selected configuration is for a DRX WUS that uses a pseudo-omnidirectional beam. In a second aspect, alone or in combination with the first aspect, the selected configuration is for a DRX WUS that uses beam sweeping with multiple directional beams. In a third aspect, alone or in combination with any one or more of the first through second aspects, the selected configuration does not use the DRX WUS. In a fourth aspect, alone or in combination with any one or more of the first through third aspects, the UE may transmit information indicating a capability of the UE with regard to the DRX WUS or a requested configuration for the DRX WUS. In a fifth aspect, alone or in combination with any one or more of the first through fourth aspects, the monitoring is performed by a wakeup receiver of the UE. In some aspects, the UE may transmit a radio link quality parameter to permit the selected configuration to be selected from the plurality of configurations. In a sixth aspect, alone or in combination with any one or more of the first through fifth aspects, the UE may determine that a radio link quality parameter satisfies a threshold; and transmit the radio link quality parameter, to permit the selected configuration to be selected from the plurality of configurations, based at least in part on the radio link quality parameter satisfying the threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where a base station (e.g., BS 110) performs configuration of a C-DRX wakeup signal in 5G/NR.

As shown in FIG. 9, in some aspects, process 900 may include transmitting information identifying a selected configuration for a discontinuous reception (DRX) wakeup signal (WUS) for a user equipment (UE), wherein the selected configuration is one of a plurality of configurations (block 910). For example, the base station (e.g., using controller/processor 240, transmit processor 220, TX MIMO processor 230, MOD 232, antenna 234, and/or the like) may transmit information identifying a selected configuration for a DRX WUS, as described, for example, in connection with FIGS. 5, 6, and 7. The selected configuration may be for one or more UEs. In some aspects, the base station may determine the selected configuration. In some aspects, the base station may determine multiple selected configurations for multiple UEs. The selected configuration may be selected from a plurality of configurations.

As shown in FIG. 9, in some aspects, process 900 may include transmitting the DRX WUS according to the selected configuration (block 920). For example, the base station (e.g., using controller/processor 240, transmit processor 220, TX MIMO processor 230, MOD 232, antenna 234, and/or the like) may transmit the DRX WUS when the UE is to awaken in a next ON duration, as described, for example, in connection with FIGS. 5, 6, and 7. The base station may transmit the DRX WUS according to the selected configuration. For example, the base station may transmit the DRX WUS using a pseudo-omnidirectional beam or a beam swept directional beam set according to the selected configuration. In some aspects, the base station may determine that no DRX WUS is to be transmitted based at least in part on the selected configuration (e.g., when the selected configuration is for a fallback mode).

Process 900 may include additional aspects, such as any single aspect or any combination of aspects described below and/or in connection with one or more other processes described elsewhere herein.

In a first aspect, the selected configuration is for a DRX WUS that uses a pseudo-omnidirectional beam. In a second aspect, alone or in combination with the first aspect, aspects, the selected configuration is for a DRX WUS that uses beam sweeping with multiple directional beams. In a third aspect, alone or in combination with any one or more of the first through second aspects, the selected configuration does not use the DRX WUS. In a fourth aspect, alone or in combination with any one or more of the first through third aspects, the selected configuration is selected based at least in part on a radio link quality associated with the UE. In a fifth aspect, alone or in combination with any one or more of the first through fourth aspects, the base station may receive information indicating a capability of the UE with regard to the DRX WUS or a requested configuration for the DRX WUS, wherein the selected configuration is selected based at least in part on the information indicating the capability or the requested configuration. In a sixth aspect, alone or in combination with any one or more of the first through fifth aspects, the base station may transmit information identifying selected configurations for DRX WUSs for a plurality of UEs, wherein a selected configuration for a first UE of the plurality of UEs is different than a selected configuration for a second UE of the plurality of UEs; and transmit the DRX WUSs according to the selected configurations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are contemplated in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving information identifying a selected configuration for a discontinuous reception (DRX) wakeup signal (WUS) for the UE,
wherein the selected configuration is one of a plurality of configurations,
wherein the plurality of configurations comprises:
a first configuration for the DRX WUS that uses a pseudo-omnidirectional beam, and
a second configuration for the DRX WUS that uses beam sweeping with multiple directional beams;

selectively monitoring a wakeup signal resource according to the selected configuration;
receiving the DRX WUS according to the selected configuration based on selectively monitoring the wakeup signal resource; and
transitioning to an awake state based on receiving the DRX WUS.

2. The method of claim 1, further comprising:
receiving information identifying another selected configuration, wherein the other selected configuration does not use the DRX WUS; and
transitioning to another mode based on the other selected configuration.

3. The method of claim 1, further comprising:
transmitting information indicating a capability of the UE with regard to the DRX WUS or a requested configuration for the DRX WUS.

4. The method of claim 1, wherein the monitoring is performed by a wakeup receiver of the UE.

5. The method of claim 1, further comprising:
transmitting a radio link quality parameter to permit the selected configuration to be selected from the plurality of configurations.

6. The method of claim 1, further comprising:
determining that a radio link quality parameter satisfies a threshold; and
transmitting the radio link quality parameter, to permit the selected configuration to be selected from the plurality of configurations, based at least in part on the radio link quality parameter satisfying the threshold.

7. The method of claim 1, wherein the selected configuration is the first configuration based on a radio link quality parameter satisfying a threshold.

8. The method of claim 1, wherein the selected configuration is the second configuration based on a radio link quality parameter not satisfying a threshold.

9. A method of wireless communication performed by a base station, comprising:
transmitting information identifying a selected configuration for a discontinuous reception (DRX) wakeup signal (WUS) for a user equipment (UE),
wherein the selected configuration is one of a plurality of configurations,
wherein the plurality of configurations comprises:
a first configuration for the DRX WUS that uses a pseudo-omnidirectional beam, and
a second configuration for the DRX WUS that uses beam sweeping with multiple directional beams; and
transmitting the DRX WUS, according to the selected configuration, to cause the UE to transition to an awake state.

10. The method of claim 9, further comprising:
transmitting information identifying another selected configuration, wherein the other selected configuration does not use the DRX WUS.

11. The method of claim 9, wherein the selected configuration is selected based at least in part on a radio link quality associated with the UE.

12. The method of claim 9, further comprising:
receiving information indicating a capability of the UE with regard to the DRX WUS or a requested configuration for the DRX WUS; and
selecting the selected configuration based at least in part on the information indicating the capability or the requested configuration.

13. The method of claim 9, further comprising:
transmitting information identifying selected configurations for DRX WUSs for a plurality of UEs, wherein a selected configuration for a first UE of the plurality of UEs is different than a selected configuration for a second UE of the plurality of UEs; and
transmitting the DRX WUSs according to the selected configurations.

14. The method of claim 9, further comprising:
receiving a radio link quality parameter based on the radio link quality parameter satisfying a threshold.

15. The method of claim 9, further comprising:
selecting the first configuration as the selected configuration based on a radio link quality parameter satisfying a threshold.

16. A user equipment (UE) for wireless communication, comprising:
a memory; and
one or more processors coupled to the memory, the memory and the one or more processors configured to:
receive information identifying a selected configuration for a discontinuous reception (DRX) wakeup signal (WUS) for the UE,
wherein the selected configuration is one of a plurality of configurations,
wherein the plurality of configurations comprises:
a first configuration for the DRX WUS that uses a pseudo-omnidirectional beam, and
a second configuration for the DRX WUS that uses beam sweeping with multiple directional beams;
selectively monitor a wakeup signal resource according to the selected configuration;
receive the DRX WUS according to the selected configuration based on selectively monitoring the wakeup signal resource; and
transition to an awake state based on receiving the DRX WUS.

17. The UE of claim 16, wherein the one or more processors are further to:
receive information identifying another selected configuration, wherein the other selected configuration does not use the DRX WUS; and
transition to another mode based on the other selected configuration.

18. The UE of claim 16, wherein the one or more processors are further configured to:
transmit information indicating a capability of the UE with regard to the DRX WUS or a requested configuration for the DRX WUS.

19. The UE of claim 16, wherein the monitoring is performed by a wakeup receiver of the UE.

20. The UE of claim 16, wherein the one or more processors are further configured to:
transmit a radio link quality parameter to permit the selected configuration to be selected from the plurality of configurations.

21. The UE of claim 16, wherein the one or more processors are further configured to:
determine that a radio link quality parameter satisfies a threshold; and
transmit the radio link quality parameter, to permit the selected configuration to be selected from the plurality of configurations, based at least in part on the radio link quality parameter satisfying the threshold.

22. The UE of claim 16, wherein the selected configuration is the first configuration based on a radio link quality parameter satisfying a threshold.

23. The UE of claim 16, wherein the selected configuration is the second configuration based on a radio link quality parameter not satisfying a threshold.

24. A base station for wireless communication, comprising:
a memory; and
one or more processors coupled to the memory, the memory and the one or more processors configured to:
transmit information identifying a selected configuration for a discontinuous reception (DRX) wakeup signal (WUS) for a user equipment (UE),
wherein the selected configuration is one of a plurality of configurations,
wherein the plurality of configurations comprises:
a first configuration for the DRX WUS that uses a pseudo-omnidirectional beam, and
a second configuration for the DRX WUS that uses beam sweeping with multiple directional beams; and
transmit the DRX WUS, according to the selected configuration, to cause the UE to transition to an awake state.

25. The base station of claim 24, wherein the one or more processors are further to:
transmit information identifying another selected configuration, wherein the other selected configuration does not use the DRX WUS.

26. The base station of claim 24, wherein the selected configuration is selected based at least in part on a radio link quality associated with the UE.

27. The base station of claim 24, wherein the one or more processors are further configured to:
receive information indicating a capability of the UE with regard to the DRX WUS or a requested configuration for the DRX WUS; and
select the selected configuration based at least in part on the information indicating the capability or the requested configuration.

28. The base station of claim 24, wherein the one or more processors are further configured to:
transmit information identifying selected configurations for DRX WUSs for a plurality of UEs, wherein a selected configuration for a first UE of the plurality of UEs is different than a selected configuration for a second UE of the plurality of UEs; and
transmit the DRX WUSs according to the selected configurations.

29. The base station of claim 24, wherein the one or more processors are to:
receive a radio link quality parameter based on the radio link quality parameter satisfying a threshold.

30. The base station of claim 24, wherein the one or more processors are to:
select the first configuration as the selected configuration based on a radio link quality parameter satisfying a threshold.

* * * * *